(12) United States Patent  (10) Patent No.: US 8,521,240 B2
Nishizono et al.  (45) Date of Patent: Aug. 27, 2013

(54) PORTABLE TERMINAL

(75) Inventors: Mitsuhiro Nishizono, Kanagawa (JP); Hiroshi Sakai, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 25 days.

(21) Appl. No.: 13/258,938

(22) PCT Filed: Mar. 26, 2010

(86) PCT No.: PCT/JP2010/055444
§ 371 (c)(1), (2), (4) Date: Sep. 22, 2011

(87) PCT Pub. No.: WO2010/110449
PCT Pub. Date: Sep. 30, 2010

(65) Prior Publication Data
US 2012/0028692 A1   Feb. 2, 2012

(30) Foreign Application Priority Data

Mar. 26, 2009  (JP) .................................. 2009-077771

(51) Int. Cl.
*H04M 1/00* (2006.01)
(52) U.S. Cl.
USPC .................. 455/575.4; 455/575.1; 455/575.7
(58) Field of Classification Search
USPC .................................. 455/575.4, 575.7, 575.1
See application file for complete search history.

(56) References Cited

U.S. PATENT DOCUMENTS

2006/0111159 A1* 5/2006 Ide ............................. 455/575.1
2009/0085696 A1* 4/2009 Abdul-Gaffoor et al. .. 333/24 C

FOREIGN PATENT DOCUMENTS

| JP | 2006-67361 A | 3/2006 |
| JP | 2006-254082 A | 9/2006 |
| JP | 2007-336038 A | 12/2007 |
| JP | 2009-044326 A | 2/2009 |

OTHER PUBLICATIONS

International Search Report for PCT/JP2010/055444, mailed Jun. 29, 2010.

* cited by examiner

*Primary Examiner* — Kamran Afshar
*Assistant Examiner* — Omoniyi Obayanju
(74) *Attorney, Agent, or Firm* — Hoffmann & Baron LLP

(57) ABSTRACT

Provided is a portable terminal capable of ensuring satisfactory antenna characteristics regardless of a change in state, and of accommodating a plurality of frequency bands. A first circuit unit comprises: a first signal source; a first power feeding unit connected to a first antenna unit; a second power feeding unit connected to a first connection unit; a first switching unit which connects the first power feeding unit or the second power feeding unit to the first signal source by switching; and a first control unit which controls the first switching unit so as to connect the second power feeding unit to the first signal source when the portable terminal is transitioned to a second state. A first disconnection unit is disposed between the first connection unit and the first circuit unit and disconnects a first signal.

8 Claims, 12 Drawing Sheets

PRIOR ART

PRIOR ART

PORTABLE TERMINAL

CROSS-REFERENCE TO RELATED APPLICATIONS

This application is the National Stage of International Application No. PCT/JP2010/055444, filed Mar. 26, 2010, which claims the benefit of Japanese Application No. 2009-077771, filed Mar. 26, 2009, the entire contents of all of which are incorporated by reference herein.

FIELD OF THE INVENTION

The present invention relates to a mobile terminal device including a first body and a second body.

BACKGROUND OF THE INVENTION

Among cellular telephone devices as a type of a mobile terminal device that is configured with a first body with an operation unit formed on a top face, and a second body with a display unit formed on a top face, there is a cellular telephone device including a sliding mechanism. By utilizing the sliding mechanism, the cellular telephone device can transition to a state in which the second body covers the operation unit formed on the top face of the first body, by mutually superimposing the first body and the second body such that the display unit is exposed to the outside (hereinafter referred to as a slid-down state), and a state in which the operation unit formed on the top face of the first body is exposed, by sliding the second body in a longitudinal direction relative to the first body (hereinafter referred to as a slid-up state).

By sliding the first body and the second body, a cellular telephone device including such a sliding mechanism transitions to the slid-up state in which the display unit and the operation unit are exposed to the outside, and as a result, it is possible to achieve convenience that key operations can be performed while visually confirming the display screen. Furthermore, the cellular telephone device in the slid-down state has an external appearance that only the display of the first body is exposed to the outside, and as a result, it is possible to achieve space-saving. In addition, if the display is configured with a touch sensor, and/or if a simplified operation unit is formed on the top face of the second body, the cellular telephone device in the slid-down state can also secure operability while achieving space-saving.

For a cellular telephone device including such a sliding mechanism, a method has been proposed, in which a circuit board and a conductor in the bodies are used as antennas (see Patent Document 1). FIGS. 10A, 10B, 11A and 11B are cross-sectional views schematically showing an internal structure of a portable wireless device 200. Moreover, a first body 201 includes an operation unit 202, a circuit board 203, and an antenna 204. A second body 301 includes an operation unit 302, a display 303, and a circuit board 304.

According to a first embodiment of Patent Document 1, in the slid-down state (FIG. 10A), the portable wireless device 200 as an example of a mobile terminal device is configured such that a connection part 204a electrically connected to the antenna 204 is not superimposed, i.e. not coupled at high frequency, with the circuit board 304 of the second body 301 in a thickness direction. As a result, satisfactory antenna characteristics can be achieved in the portable wireless device 200 in the slid-down state.

In addition, the portable wireless device 200 in the slid-up state (FIG. 10B) is configured to supply power to the circuit board 304 of the second body 301 via the connection part 204a that is electrically connected to the antenna 204, so that the circuit board 304 is utilized as an antenna element. As a result, satisfactory antenna characteristics can be achieved in the portable wireless device 200 in the slid-up state. A virtual line A in FIG. 10B schematically shows an aspect in which a high-frequency current is supplied from the first body 201 side to the second body 301 side by connecting the connection part 204a and the circuit board 304.

Furthermore, according to a second embodiment of Patent Document 1, although an outline thereof is substantially similar to that of the first embodiment, the portable wireless device 200 in the slid-up state (FIG. 11A) is configured such that the circuit board 304 is utilized as an antenna element by capacitively coupling the antenna 204 and the circuit board 304 of the second body 301. More specifically, in the portable wireless device 200 in the slid-up state, the antenna 204 and the circuit board 304 of the second body 301 face each other at a predetermined interval to be capacitively coupled with each other. As a result, satisfactory antenna characteristics can be achieved in the portable wireless device 200 in the slid-up state. A virtual line B in FIG. 11A schematically shows an aspect in which a high-frequency current is supplied from the first body 201 side to the second body 301 side by capacitively coupling the antenna 204 and the circuit board 304.

Moreover, similarly to FIG. 10A, the portable wireless device 200 in the slid-down state (FIG. 11B) is configured such that the antenna 204 and the circuit board 304 of the second body 301 do not face each other, and are not capacitively coupled with each other. As a result, satisfactory antenna characteristics can be achieved in the portable wireless device 200 in the slid-down state.

Patent Document 1: Japanese Unexamined Patent Application, Publication No. 2006-67361

SUMMARY OF THE INVENTION

Problems to be Solved by the Invention

However, in a conventional mobile terminal device such as that disclosed in Patent Document 1, the first body and the second body are mutually superimposed, so that high-frequency currents flowing in the first body and the second body may cancel each other, and as a result, satisfactory antenna characteristics may be difficult to be secured in some cases.

An object of the present invention is to secure satisfactory antenna characteristics.

Means for Solving the Problems

In order to solve the aforementioned problems, the mobile terminal device according to the present invention includes: a first body; a second body; a first conductive portion disposed in the first body and including a first contact point; a second conductive portion disposed in the second body and including a second contact point; and a first circuit unit disposed in any one of the first body and the second body, the first circuit unit including: a first ground unit connected to the first conductive portion via the first contact point; a first power supply unit connected to the second conductive portion via the second contact point; and a first signal processing unit connected to the first power supply unit, configured to process a first high frequency signal resonated by the second conductive portion, in which the first conductive portion includes a first area overlapping with the second conductive portion, the second conductive portion includes a second area overlapping with the first conductive portion, and a first cutoff part is connected to at least one of the first conductive portion and the second conductive portion, and cuts off transmission of the first high frequency signal to an area toward a fist end side from the first contact point of the first area, or to an area toward a second end side from the second contact point of the second area.

Moreover, in the mobile terminal device, a transmission path length of the first high frequency signal in the area toward the second end side from the first contact point of the first conductive portion is preferably substantially identical to a transmission path length of the first high frequency signal in the area toward the first end side from the second contact point of the second conductive portion.

In addition, it is preferable for the mobile terminal device to further include a second circuit unit disposed in any one of the first body and the second body, the second circuit unit including: a second ground unit connected to any one of the first conductive portion and the second conductive portion via any one of the first contact point and the second contact point; a second power supply unit connected to another one of the first conductive portion and the second conductive portion via another one of the first contact point and the second contact point; and a second signal processing unit connected to the second power supply unit, configured to process a second high frequency signal resonated by another one of the first conductive portion and the second conductive portion, in which a second cutoff part is connected to at least one of the first conductive portion and the second conductive portion, and cuts off transmission of the second high frequency signal to an area toward the second end side from the first contact point of the first area, or to an area toward the first end side from the second contact point of the second area.

Furthermore, in the mobile terminal device, a transmission path length of the second high frequency signal in the area toward the first end side from the first contact point of the first conductive portion is preferably substantially identical to a transmission path length of the second high frequency signal in the area toward the second end side from the second contact point of the second conductive portion.

Moreover, in the mobile terminal device, frequency of the first high frequency signal is preferably different from frequency of the second high frequency signal.

In addition, in the mobile terminal device, the first contact point and the second contact point are preferably capacitively coupled with each other.

Furthermore, in the mobile terminal device, the first cutoff part preferably includes a parallel resonant circuit including a capacitor having predetermined capacity and a coil.

Moreover, in the mobile terminal device, the second cutoff part preferably includes a parallel resonant circuit including a capacitor having predetermined capacity and a coil.

Effects of the Invention

According to the present invention, while employing a method in which the circuit board and the conductor in the bodies are used as antennas, satisfactory antenna characteristics can be secured, and compatibility with a plurality of frequency bands can be established, in the slid-up state and the slid-down state.

DETAILED DESCRIPTION OF THE INVENTION

Figure 1:
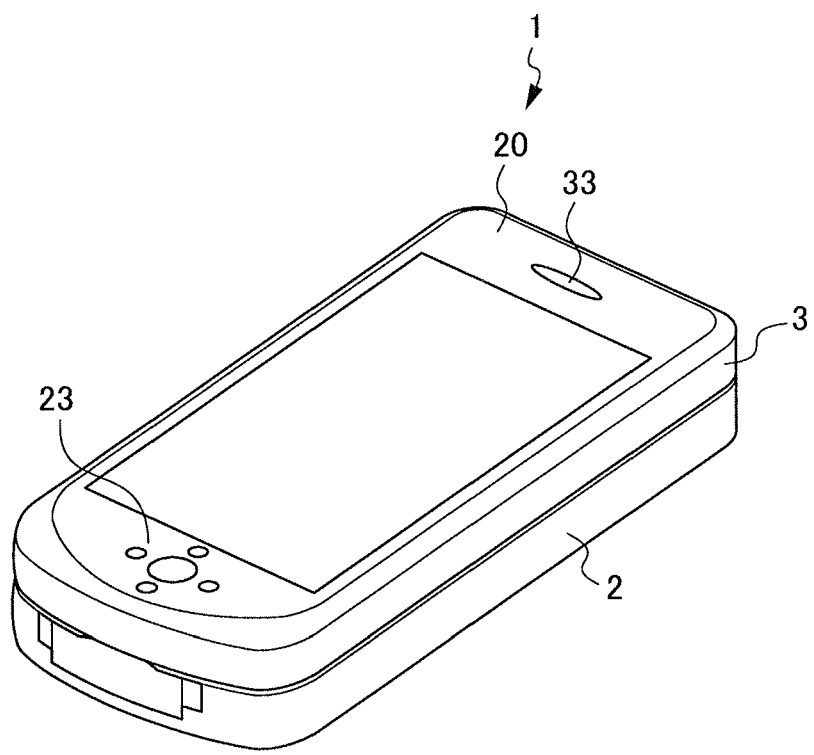
FIG. 1 is a perspective view showing an appearance of a cellular telephone device in a slid-down state (first state) according to the present invention.
Figure 2:
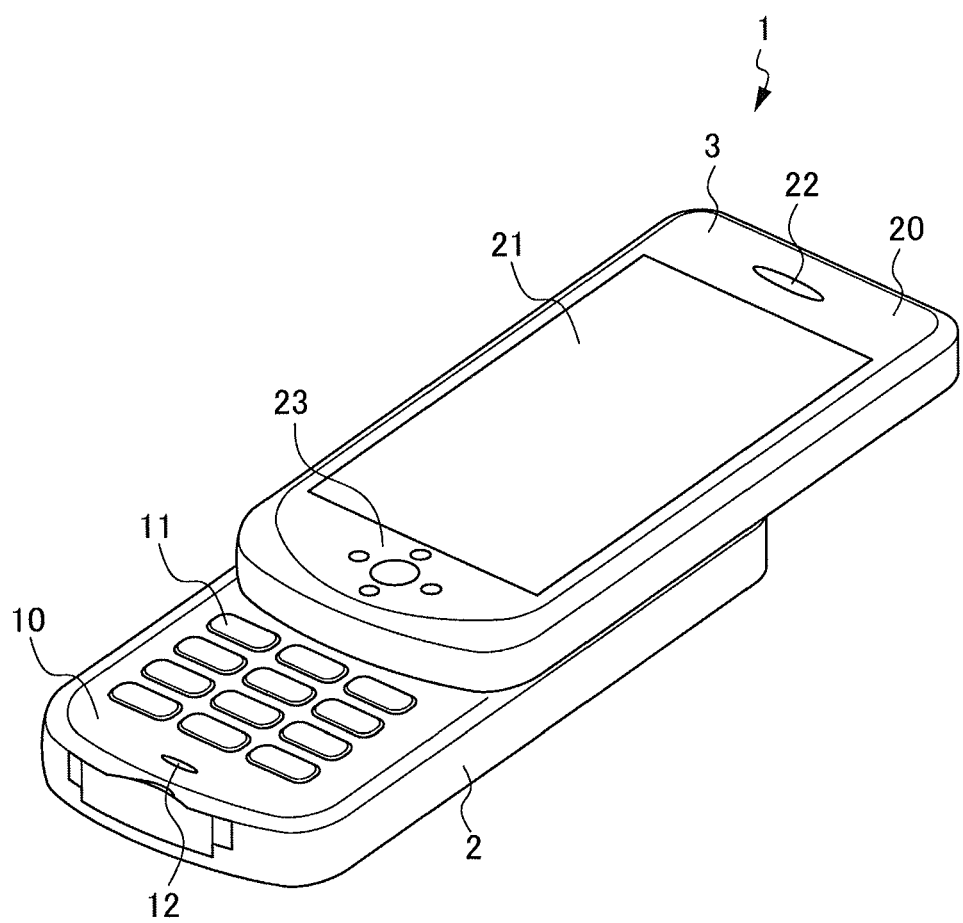
FIG. 2 is a perspective view showing an appearance of the cellular telephone device in a slid-up state (second state) according to the present invention.

Descriptions are provided hereinafter regarding embodiments of the present invention. FIGS. 1 and 2 are perspective views showing an appearance of a cellular telephone device 1 as an example of the mobile terminal device according to the present invention. In addition, although the cellular telephone device 1 will be described in the present embodiments, the present invention is not limited to a cellular telephone device, and may be, for example, a PHS (Personal Handyphone System), a PDA (Personal Digital Assistant), a portable navigation device, a notebook PC or the like.

The cellular telephone device 1 is configured to include an operation unit side body 2 (first body) and a display unit side body 3 (second body). The operation unit side body 2 is configured to include, on a front face portion 10 thereof, an operation key set 11 and a microphone 12 to which sound produced by a user of the cellular telephone device 1 during a phone call is input. The operation key set 11 is configured with input operation keys for inputting characters such as numeric characters of a telephone number and characters of mail and the like.

Furthermore, the display unit side body 3 is configured with, on a front face portion 20 thereof, a display 21 for displaying a variety of information, a sound output unit 22 for outputting sound of the other party of the conversation, and a selection operation key 23 for performing selection of various operations, scrolling, etc.

It should be noted that the cellular telephone device 1 is also configured with other components in addition to those described above. The other components are, for example, an imaging unit configured with a CCD (Charge Coupled Device) camera, a CMOS (Complementary Metal Oxide Semiconductor) camera or the like that captures an image of a subject, a speaker that externally outputs music and the like, etc.

Moreover, an upper end portion of the operation unit side body 2 and a lower end portion of the display unit side body 3 are connected via a connecting portion (not illustrated) including a sliding mechanism. Therefore, the cellular telephone device 1 can freely transition between: a state in which the operation unit side body 2 and the display unit side body 3 are mutually superimposed, and the display unit side body 3 covers a top face of the operation unit side body 2 (a slid-down state, hereinafter referred to as a first state) (see FIG. 1); and a state in which the display unit side body 3 is slid in a longitudinal direction in relation to the operation unit side body 2, and a covered portion (the operation key set 11 and the microphone 12) of the operation unit side body 2 is exposed (a slid-up state, hereinafter referred to as a second state) (see FIG. 2).

It should be noted that, although FIG. 1 shows an embodiment of a sliding-type cellular telephone device, the cellular telephone device according to the present invention is not particularly limited thereto, and can be implemented as, for example, a straight shape or the like without a connecting mechanism.

The cellular telephone device 1 according to the present invention has a function that is compatible with a plurality of frequency bands, while securing satisfactory antenna characteristics in the first state and the second state, and employing a method in which a circuit board and a conductor in the bodies are used as a part of the antenna.

First Configuration

Figure 3:
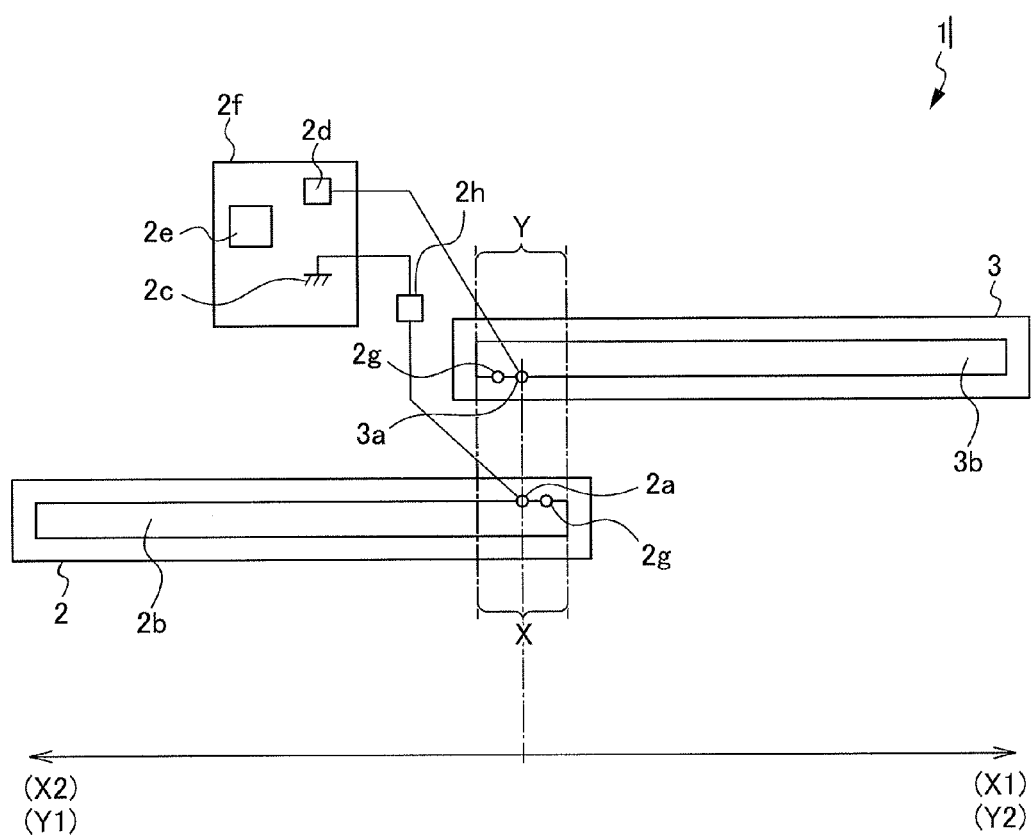
FIG. 3 is a view schematically showing a cross section of the cellular telephone device according to the present invention.

Here, a configuration for exhibiting the function is described. As shown in FIG. 3, the cellular telephone device 1 includes the operation unit side body 2, the display unit side body 3, a first conductive portion 2b, a second conductive portion 3b, a first circuit unit 2f, and a first high-frequency cutoff unit 2h.

The first conductive portion 2b is disposed in the operation unit side body 2, and has a first contact point 2a. The second conductive portion 3b is disposed in the display unit side body 3, and has a second contact point 3a.

The first circuit unit 2f has: a first ground unit 2c, which is disposed in any one of the operation unit side body 2 and the display unit side body 3, and which is connected to the first conductive portion 2b via the first contact point 2a; a first power supply unit 2d that is connected to the second conductive portion 3b via the second contact point 3a; and a first signal processing unit 2e, which is connected to the first power supply unit 2d, and which processes a first high frequency signal resonated by the second conductive portion 3b.

A first area X overlapping with the second conductive portion 3b is formed in the first conductive portion 2b. A second area Y overlapping with the first conductive portion 2b is formed in the second conductive portion 3b. A first cutoff part 2g is connected to at least one of the first conductive portion 2b and the second conductive portion 3b, and cuts off transmission of the first high frequency signal to an area X1 toward a first end side from the first contact point 2a of the first area X, or to an area Y1 toward a second end side from the second contact point 3a of the second area Y. In addition, the first high-frequency cutoff unit 2h cuts off the first high frequency signal. It should be noted that, in FIG. 3, although the first cutoff part 2g is connected to a position that cuts off transmission of the first high frequency signal to the area X1 toward the first end side from the first contact point 2a of the first area X, or to the area Y1 toward the second end side from the second contact point 3a of the second area Y, the present invention is not limited thereto. In place of the aforementioned configuration, the first cutoff part 2g may be connected to a position that cuts off transmission of the first high frequency signal to an area X2 toward the second end side from the first contact point 2a of the first area X, or to an area Y2 toward the first end side from the second contact point 3a of the second area Y.

In this way, the cellular telephone device 1 is configured to suppress mutual cancellation due to the first high frequency signal transmitted from the operation unit side body 2 side to the display unit side body 3 side; therefore, for example, even if the first conductive portion 2b is utilized as a ground unit of the antenna, and the second conductive portion 3b is utilized as a radiating element of the antenna, satisfactory antenna characteristics can be achieved without deteriorating the antenna gain.

First Embodiment

Figure 4A:
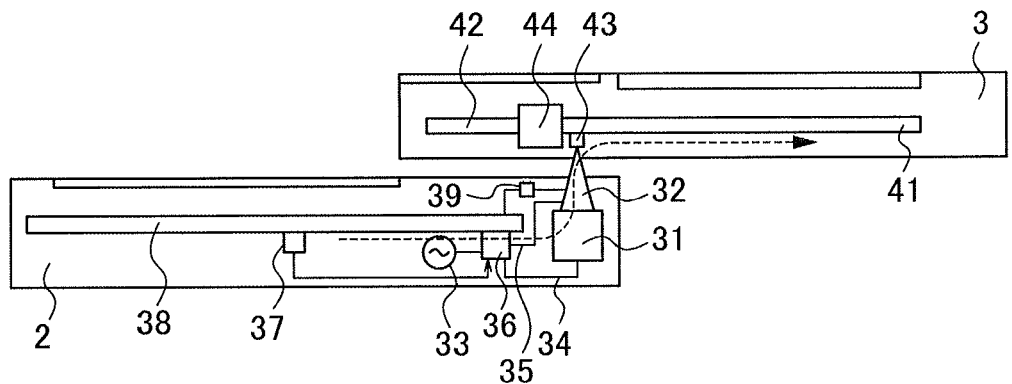
FIG. 4A is a view schematically showing a cross section of the cellular telephone device in the second state according to the present invention.

Next, a specific embodiment of the first configuration is described. As shown in FIG. 4, the operation unit side body 2 includes a first antenna unit 31, a first connection part 32, a first circuit unit 38, and a first cutoff part 39.

The first antenna unit 31 performs communication by way of a first signal S1 modulated at first frequency. The first circuit unit 38 has: a first signal source 33; a first power supply unit 34 connected to the first antenna unit 31; a second power supply unit 35 connected to the first connection part 32; a first switching unit 36 that switches the first power supply unit 34 or the second power supply unit 35 to be connected to the first signal source 33; and a first control unit 37 that controls the first switching unit 36 to connect the second power supply unit 35 to the first signal source 33 in a case of transitioning to the second state.

The first cutoff part 39 is disposed between the first connection part 32 and the first circuit unit 38, and cuts off the first signal S1. Furthermore, the first cutoff part 39 suppresses signals (for example, direct current signals) other than the first signal S1 from passing therethrough.

The display unit side body 3 includes a second circuit unit 41, a third circuit unit 42, a second connection part 43, and a second cutoff part 44.

Moreover, as shown in FIG. 4, the second connection part 43 is disposed between the second circuit unit 41 and the third circuit unit 42, and is connected to the first connection part 32 at high frequency in a case of transitioning to the second state.

The second cutoff part 44 is disposed between the third circuit unit 42 and the second connection part 43, and cuts off the first signal S1 transmitted via the first connection part 32 when transitioning to the second state in which the first connection part 32 and the second connection part 43 are connected at high frequency.

When transitioning to the second state, the second circuit unit 41 is disposed in a position that does not face the first circuit unit 38, and performs communication by way of the first signal S1.

In addition, although shown in the example in FIG. 4, the first connection part 32 and the second connection part 43 are illustrated as being physically connected with each other, it is not limited thereto. For example, by forming a surface with a conductive material, the first connection part 32 and the second connection part 43 may be configured to be capacitively coupled when facing each other at a predetermined distance when the cellular telephone device 1 transitions to the second state. According to such a configuration, the first signal S1 is transmitted from the first circuit unit 38 to the second circuit unit 41 through capacitive coupling.

It should be noted that, in the present embodiment, a part of the first circuit unit 38 corresponds to the first conductive portion 2b described above. Furthermore, the second circuit unit 41 and the third circuit unit 42 correspond to the second conductive portion 3b described above. Moreover, a part of the first circuit unit 38 corresponds to the first circuit unit 2f described above. In addition, the first connection part 32 corresponds to the first contact point 2a described above. Furthermore, the second connection part 43 corresponds to the second contact point 3a described above. Moreover, the first power supply unit 2d described above corresponds to a configuration when the first switching unit 36 is switched to connect the first signal source 33 and the second power supply unit 35. In addition, the first signal S1 corresponds to the first high frequency signal described above. Furthermore, the second cutoff part 44 or the first cutoff part 39 corresponds to the first cutoff part 2g described above.

Figure 5A:
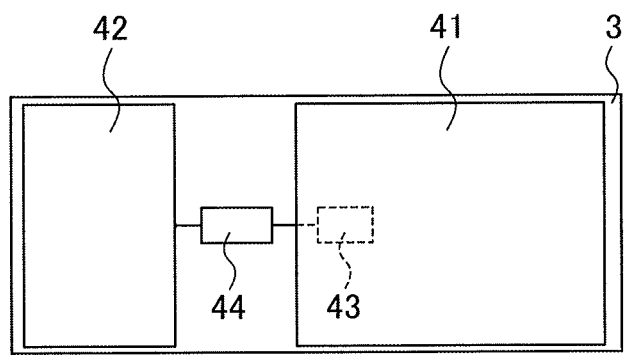
FIG. 5A is a view schematically showing an internal configuration of a display unit side body shown in FIGS. 4A and 4B.
Figure 5B:
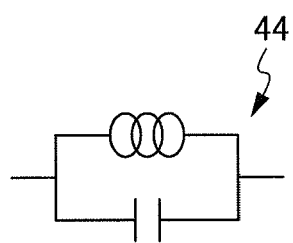
FIG. 5B is a view schematically showing an internal configuration of the display unit side body shown in FIGS. 4A and 4B.

Next, an internal configuration of the display unit side body 3 is schematically shown in FIGS. 5A and 5B. In the display unit side body 3, the second circuit unit 41 and the third circuit unit 42 are connected via the second cutoff part 44. Moreover, as shown in FIG. 5B, the second cutoff part 44 is configured with, for example, a parallel resonant circuit that is configured with a capacitor having predetermined capacity and a coil. In the present embodiment, since the second cutoff part 44 cuts off the first signal S1, the most part of the first signal S1 transmitted to the second connection part 43 is transmitted to the second circuit unit 41. In addition, since the second cutoff part 44 does not cut off signals (for example, direct current signals) other than the first signal S1, such signals are mutually transmitted between the second circuit unit 41 and the third circuit unit 42. It should be noted that, in FIG. 5A, although the second circuit unit 41 and the third circuit unit 42 are illustrated as being separate and independent, they are not limited thereto, and may be integrally configured as a single circuit unit.

Descriptions are provided in detail for operations of the first control unit 37 in a case of transitioning to the first state and a case of transitioning to the second state, by sliding the operation unit side body 2 and the display unit side body 3 of the cellular telephone device 1. In the first state of the cellular telephone device 1, the first connection part 32 and the second connection part 43 are not connected at high frequency. In this state, the first control unit 37 performs control to switch the first switching unit 36 such that the first power supply unit 34 and the first signal source 33 are electrically conductive. Therefore, in the first state, the cellular telephone device 1 communicates with external devices via the first antenna unit 31.

Furthermore, in the second state of the cellular telephone device 1, the first connection part 32 and the second connection part 43 are connected at high frequency. In this state, the first control unit 37 performs control to switch the first switching unit 36 such that the second power supply unit 35 and the first signal source 33 are electrically conductive. A high frequency signal (corresponding to the first signal S1) generated in the first circuit unit 38 is transmitted to the second circuit unit 41 via the second power supply unit 35, the first connection part 32 and the second connection part 43. At this point in time, the first signal S1 is cut off by the second cutoff part 44, and thus is not transmitted to the third circuit unit 42.

Figure 4B:
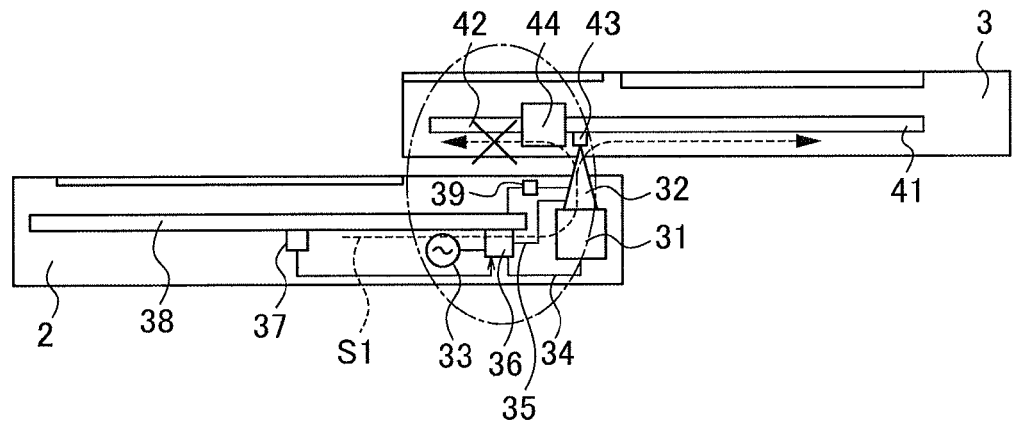
FIG. 4B is a view schematically showing a cross section of the cellular telephone device in the second state according to the present invention.

In this way, in the second state, the cellular telephone device 1 is configured to suppress mutual cancellation due to the first signal S1 transmitted from the operation unit side body 2 side to the display unit side body 3 side (see FIG. 4B). Therefore, in the cellular telephone device 1, even if the first circuit unit 38 is utilized as a ground unit of the antenna, and the second circuit unit 41 is utilized as a radiating element of the antenna, satisfactory antenna characteristics can be achieved without deteriorating the antenna gain.

It should be noted that, although a conductor for cutting off high frequency and a conductor for supplying power have been described by using a board conductor in the present embodiment, such a conductor may not be a board, and may be a shielding case or reinforcing sheet metal, and furthermore, may be an FPC board or the like used for other purposes.

Moreover, in the cellular telephone device 1, a transmission path length L1 of the first high frequency signal in the area toward the second end side from the first contact point 2a of the first conductive portion 2b is preferably substantially identical to a transmission path length L2 of the first high frequency signal in the area toward the first end side from the second contact point 3a of the second conductive portion 3b.

With such a configuration, in the cellular telephone device 1, the balance between the radiating element of the antenna and the ground unit can be made satisfactory, and the deterioration of the antenna characteristics can be suppressed.

Second Configuration

Figure 6:
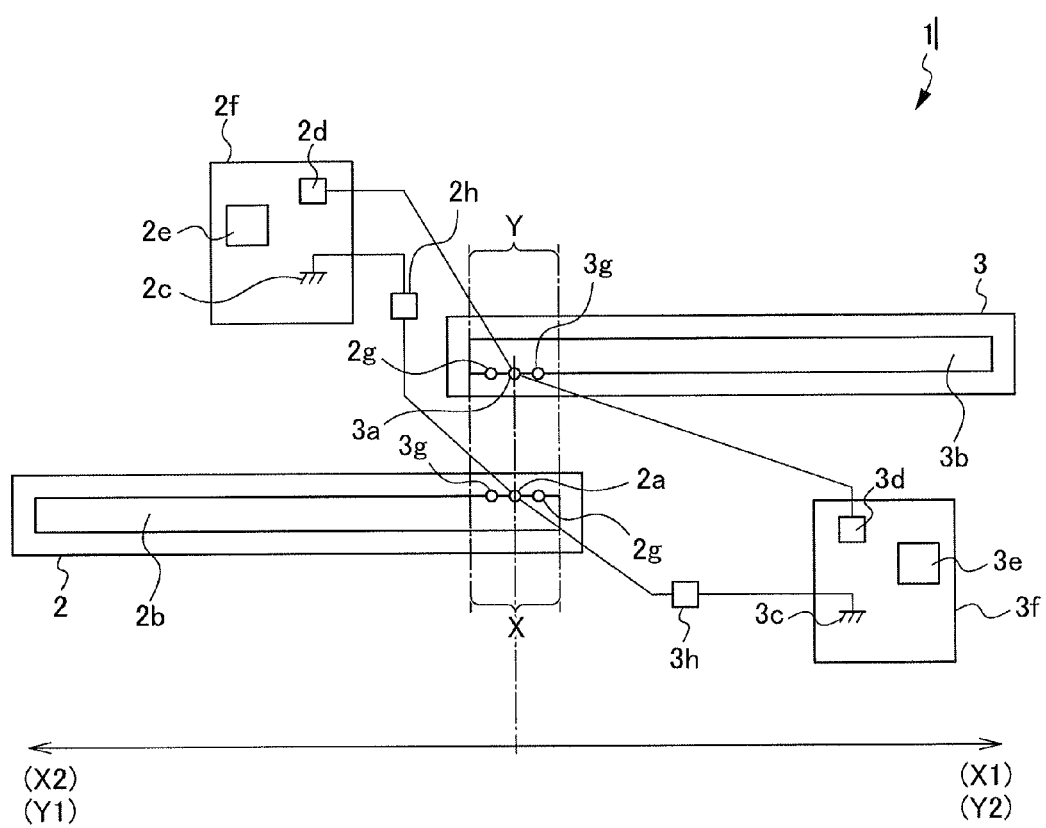
FIG. 6 is a view schematically showing a cross section of the cellular telephone device according to the present invention.

In addition, as shown in FIG. 6, the cellular telephone device 1 may be configured to further include a second circuit unit 3f and a second high-frequency cutoff unit 3h. The second circuit unit 3f has a second ground unit 3c, a second power supply unit 3d, and a second signal processing unit 3e. The second ground unit 3c is disposed in any one of the operation unit side body 2 and the display unit side body 3, and is connected to any one of the first conductive portion 2b and the second conductive portion 3b via any one of the first contact point 2a and the second contact point 3a. The second power supply unit 3d is connected to another one of the first conductive portion 2b and the second conductive portion 3b via another one of the first contact point 2a and the second contact point 3a. The second signal processing unit 3e is connected to the second power supply unit 3d, and processes a second high frequency signal resonated by another one of the first conductive portion 2b and the second conductive portion 3b. Furthermore, in the second configuration, the first high-frequency cutoff unit 2h and the second high-frequency cutoff unit 3h cut off the first high frequency signal and the second high frequency signal.

In a case in which the cellular telephone device 1 is thus configured, at least one of the first conductive portion 2b and the second conductive portion 3b is connected with a second cutoff part 3g that cuts off transmission of the second high frequency signal to the area X2 toward the second end side from the first contact point 2a of the first area X, or to the area Y2 toward the first end side from the second contact point 3a of the second area Y.

Figure 7A:
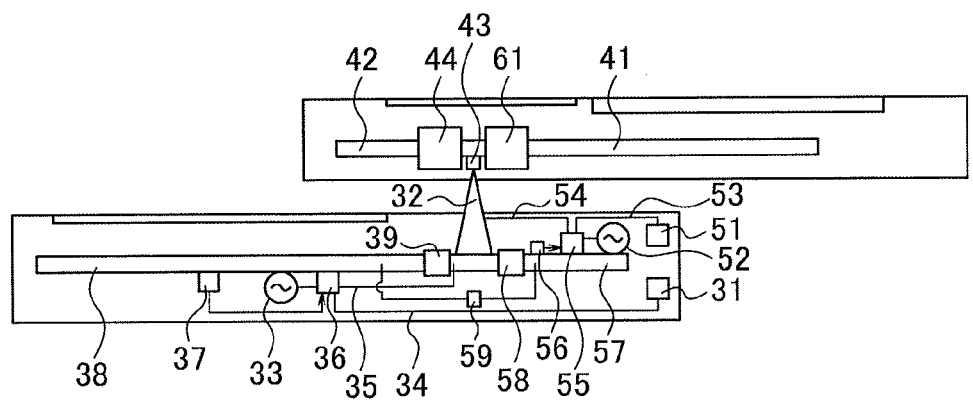
FIG. 7A is a view schematically showing a cross section of the cellular telephone device in the second state according to the present invention.
Figure 7B:
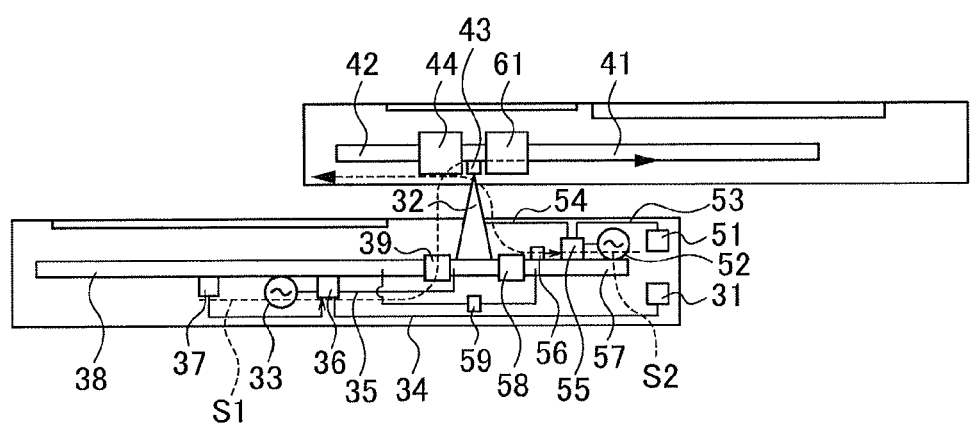
FIG. 7B is a view schematically showing a cross section of the cellular telephone device in the second state according to the present invention.

In this way, the cellular telephone device 1 is configured to suppress mutual cancellation due to the first high frequency signal and the second high frequency signal transmitted from the operation unit side body 2 side to the display unit side body 3 side (see FIG. 7B). Therefore, in the cellular telephone device 1, for example, even if the first conductive portion 2b is utilized as a ground unit of a plurality of antennas, and the second conductive portion 3b is utilized as a radiating element of the plurality of antennas, satisfactory antenna characteristics can be achieved for each of the plurality of antennas without deteriorating the antenna gain.

Second Embodiment

Figure 8:
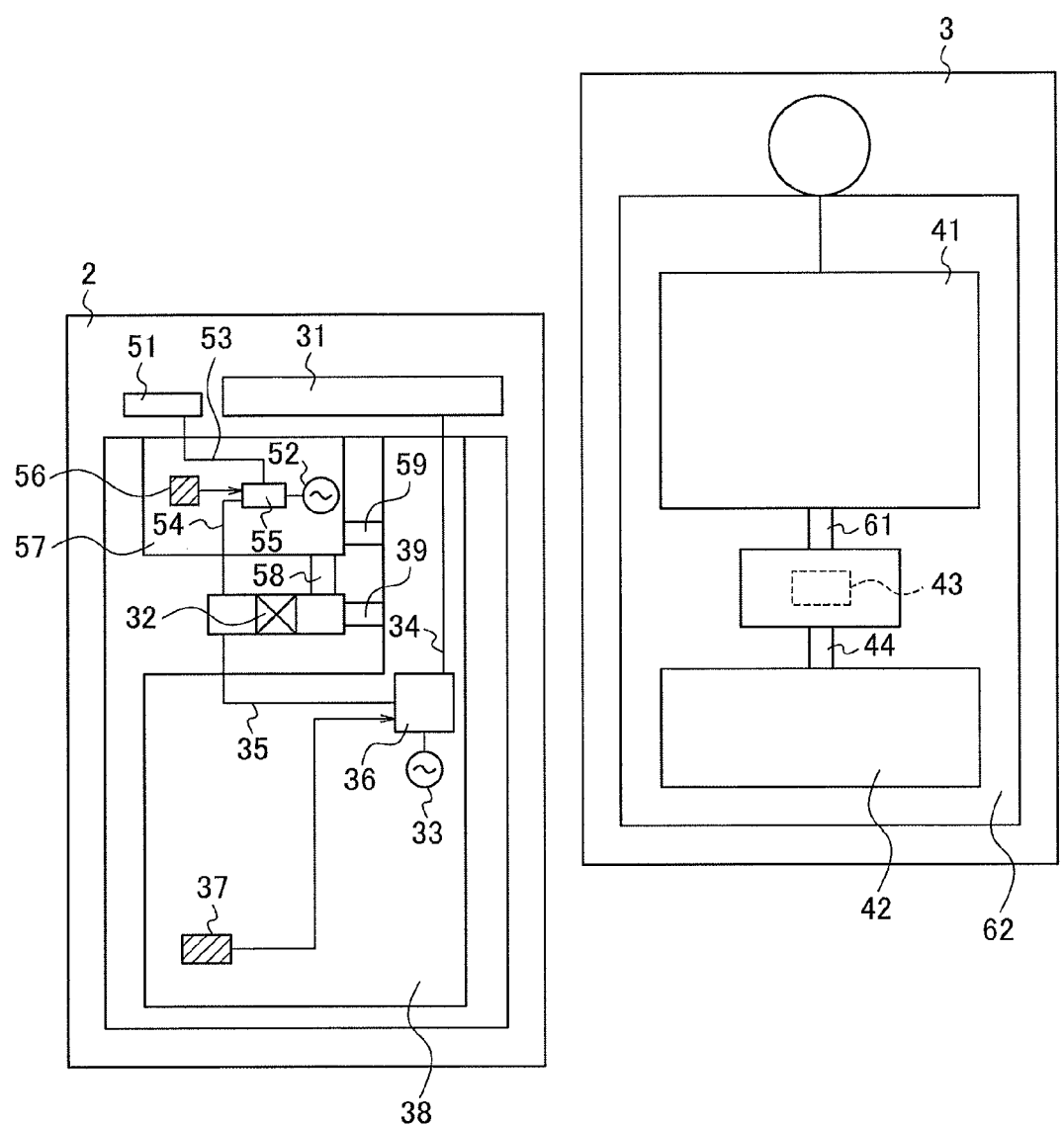
FIG. 8 is a view schematically showing an internal configuration of the display unit side body and an operation unit side body shown in FIGS. 7A and 7B.

Next, a specific embodiment of the second configuration is described. As shown in FIGS. 7A, 7B and 8, the operation unit side body 2 includes a second antenna unit 51, a fourth circuit unit 57, a third cutoff part 58, and a fourth cutoff part 59.

The second antenna unit 51 performs communication by way of a second signal S2 modulated at second frequency. The fourth circuit unit 57 has: a second signal source 52; a third power supply unit 53 connected to the second antenna unit 51; a fourth power supply unit 54 connected to the first connection part 32; a second switching unit 55 that switches the third power supply unit 53 or the fourth power supply unit 54 to be connected to the second signal source 52; and a second control unit 56 that controls the second switching unit 55 to connect the fourth power supply unit 54 to the second signal source 52 in a case of transitioning to the second state. It should be noted that the second control unit 56 may be configured integrally with the first control unit 37.

The third cutoff part 58 is disposed between the first connection part 32 and the fourth circuit unit 57, and cuts off the first signal S1 and the second signal S2. The fourth cutoff part 59 is disposed between the first circuit unit 38 and the fourth circuit unit 57, and cuts off the first signal S1 and the second signal S2.

In such a configuration, the first cutoff part 39 also cuts off the second signal S2 together with the first signal S1.

Moreover, as shown in FIGS. 7A, 7B and 8, the display unit side body 3 includes a fifth cutoff part 61. The fifth cutoff part 61 is disposed between the second circuit unit 41 and the second connection part 43, and cuts off the second signal S2 transmitted via the first connection part 32 when transitioning to the second state in which the first connection part 32 and the second connection part 43 are connected at high frequency.

In such a configuration, when transitioning to the second state, the third circuit unit 42 is disposed in a position that does not face the fourth circuit unit 57, and performs communication by way of the second signal S2.

In addition, in the cellular telephone device 1, a transmission path length L3 of the second high frequency signal in the area toward the first end side from the first contact point 2a of the first conductive portion 2b is preferably substantially identical to a transmission path length L4 of the second high frequency signal in the area toward the second end side from the second contact point 3a of the second conductive portion 3b.

With such a configuration, in the cellular telephone device 1, the balance between the radiating element and the ground unit in the plurality of antennas can be made satisfactory, and the deterioration of the antenna characteristics can be suppressed.

Moreover, in the present embodiment, the second power supply unit 3d described above corresponds to a configuration when the second switching unit 55 is switched to connect the second signal source 52 and the fourth power supply unit 54. Furthermore, the second signal S2 corresponds to the second high frequency signal described above. The fourth circuit unit 57 corresponds to the second circuit unit 3f described above. The first cutoff part 39 or the fifth cutoff part 61 corresponds to the second cutoff part 3g described above.

Moreover, in the cellular telephone device 1, frequency of the first high frequency signal (the first signal S1) is preferably different from frequency of the second high frequency signal (the second signal S2). For example, when the frequency of the first high frequency signal is 800 MHz, and the frequency of the second high frequency signal is 2 GHz, setting is performed such that the first cutoff part 2g cuts off frequency at 800 MHz, and the second cutoff part 3g cuts off frequency at 2 GHz. By setting this way, the first high frequency signal, of which mutual cancellation is suppressed, is transmitted from the first conductive portion 2b to the second conductive portion 3b; and the second high frequency signal, of which mutual cancellation is suppressed, is transmitted from the first conductive portion 2b to the second conductive portion 3b.

With such a configuration, the cellular telephone device 1 can implement a plurality of bands, while effectively utilizing the first conductive portion 2b and the second conductive portion 3b.

Regarding Operations of First Control Unit 37 and Second Control Unit 56

Next, descriptions are provided in detail for operations of the first control unit 37 and the second control unit 56 in a case of transitioning to the first state and a case of transitioning to the second state, by sliding the operation unit side body 2 and the display unit side body 3 of the cellular telephone device 1.

In the first state of the cellular telephone device 1, the first connection part 32 and the second connection part 43 are not connected at high frequency. In this state, the first control unit 37 performs control to switch the first switching unit 36 such that the first power supply unit 34 and the first signal source 33 are electrically conductive. In addition, the second control unit 56 performs control to switch the second switching unit 55 such that the third power supply unit 53 and the second signal source 52 are electrically conductive. Therefore, in the first state, the cellular telephone device 1 communicates with external devices via the first antenna unit 31 and the second antenna unit 51.

Furthermore, in the second state of the cellular telephone device 1, the first connection part 32 and the second connection part 43 are connected at high frequency. In this state, the first control unit 37 performs control to switch the first switching unit 36 such that the second power supply unit 35 and the first signal source 33 are electrically conductive. A high frequency signal (corresponding to the first signal S1) generated in the first circuit unit 38 is transmitted to the second circuit unit 41 via the second power supply unit 35, the first connection part 32 and the second connection part 43. At this point in time, the first signal S1 is cut off by the second cutoff part 44, and thus is not transmitted to the third circuit unit 42.

In this way, the cellular telephone device 1 in the second state is configured to suppress mutual cancellation due to the first signal S1 transmitted from the operation unit side body 2 side to the display unit side body 3 side (see FIG. 7B); therefore, even if the first circuit unit 38 and the second circuit unit 41 are utilized as radiating elements of the antenna, satisfactory antenna characteristics can be achieved without deteriorating the antenna gain.

Moreover, in the second state, the second control unit 56 performs control to switch the second switching unit 55 such that the fourth power supply unit 54 and the second signal source 52 are electrically conductive. A high frequency signal (corresponding to the second signal S2) generated in the fourth circuit unit 57 is transmitted to the third circuit unit 42 via the fourth power supply unit 54, the first connection part 32 and the second connection part 43. At this point in time, the second signal S2 is cut off by the fifth cutoff part 61, and thus is not transmitted to the second circuit unit 41.

In this way, the cellular telephone device 1 in the second state is configured to suppress mutual cancellation due to the second signal S2 transmitted from the operation unit side body 2 side to the display unit side body 3 side (see FIG. 7B); therefore, even if the fourth circuit unit 57 and the third circuit unit 42 are utilized as antennas, satisfactory antenna characteristics can be achieved without deteriorating the antenna gain.

It should be noted that, in the example shown in FIG. 8, although the second circuit unit 41, the third circuit unit 42, the second connection part 43, the second cutoff part 44 and the fifth cutoff part 61 are illustrated as being mounted on the circuit unit 62, they are not limited thereto.

Figure 9:
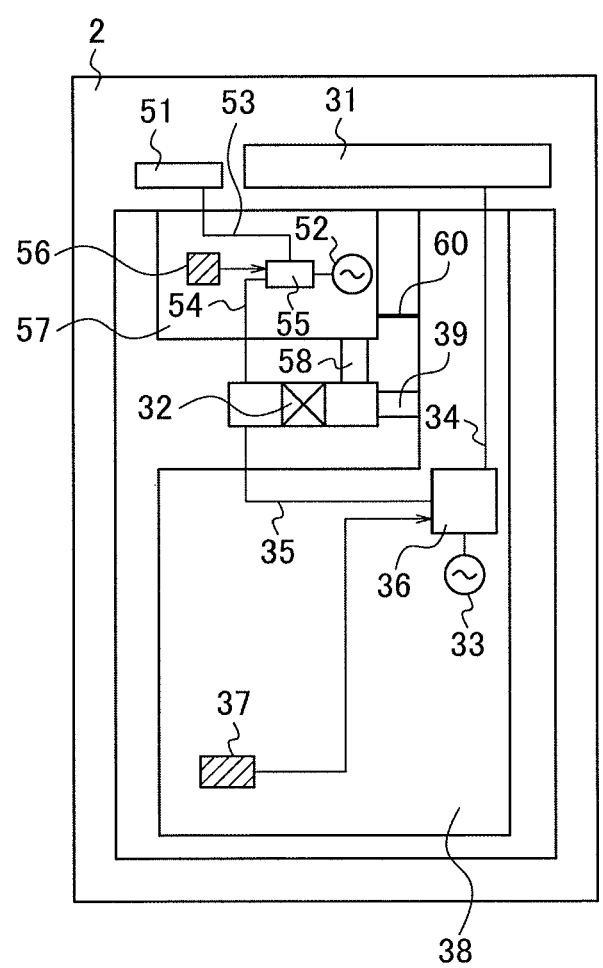
FIG. 9 is a view schematically showing an internal configuration of the operation unit side body shown in FIGS. 7A and 7B.
Figure 10A:
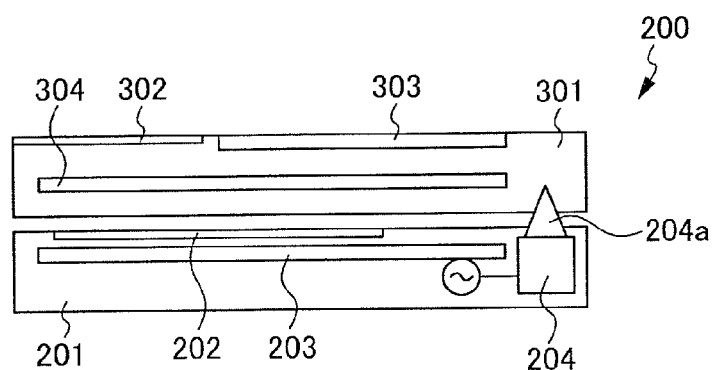
FIG. 10A is a cross-sectional view schematically showing a cross section of a portable wireless device having a sliding mechanism in the slid-up state.
Figure 10B:
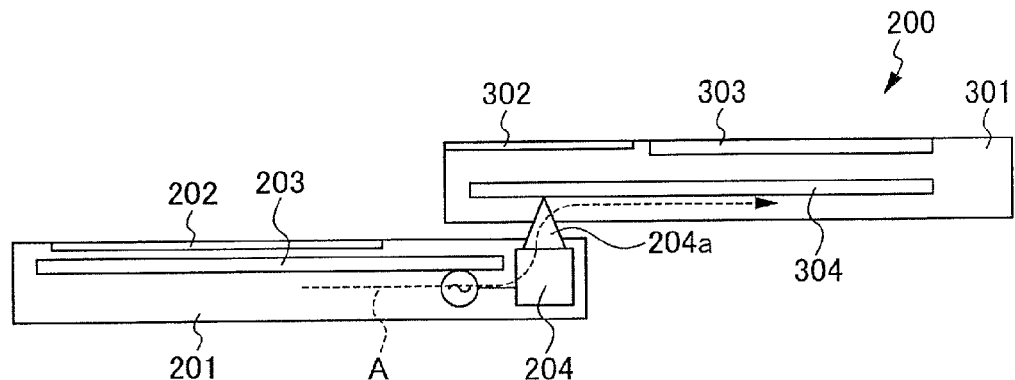
FIG. 10B is a cross-sectional view schematically showing a cross section of the portable wireless device having the sliding mechanism in the slid-down state.
Figure 11A:
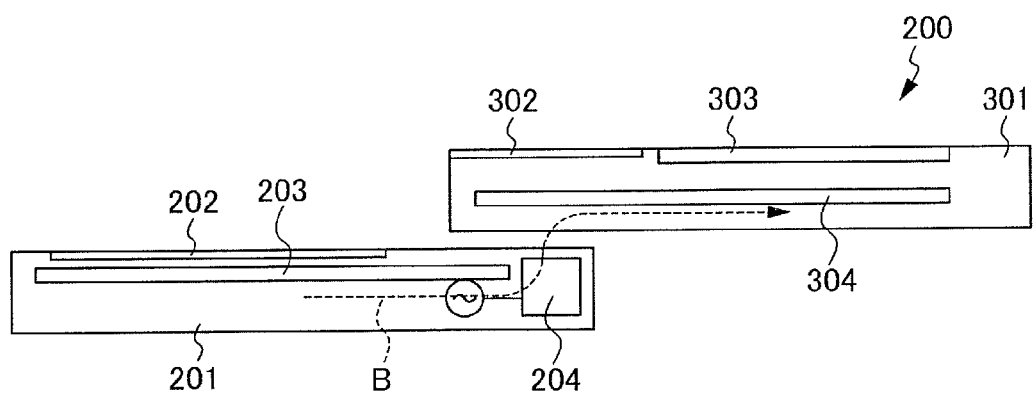
FIG. 11A is a cross-sectional view schematically showing a cross section of the portable wireless device having the sliding mechanism in the slid-up state.
Figure 11B:
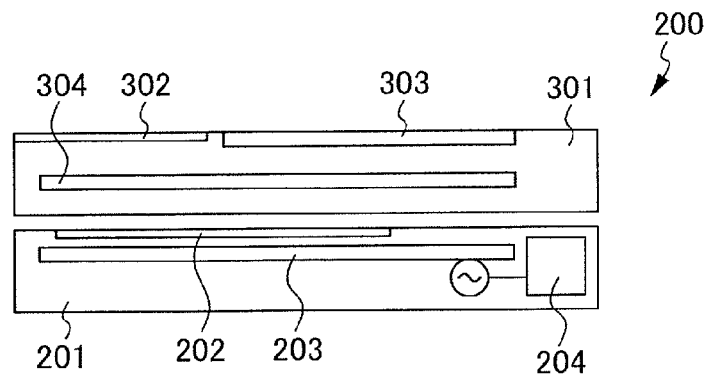
FIG. 11B is a cross-sectional view schematically showing a cross section of the portable wireless device having the sliding mechanism in the slid-down state.
Figure 12:
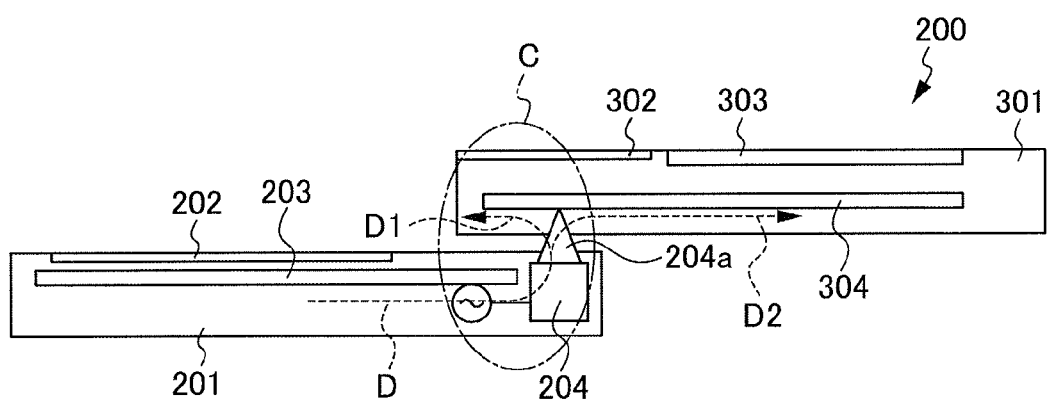
FIG. 12 is a cross-sectional view schematically showing a cross section of the portable wireless device having the sliding mechanism in the slid-up state.

In addition, as shown in FIG. 9, the fourth cutoff part 59 is configured with a connecting wire (GND line 60) with a constant width so as to conduct direct current signals while cutting off the first signal S1 and the second signal S2 that are high frequency signals. With such a configuration, the cellular telephone device 1 can be configured without the fourth cutoff part 59.

Regarding Configuration Shown in FIGS. 7A and 7B Here, the configuration shown in FIGS. 7A and 7B is further described in detail. The first cutoff part 39 and the third cutoff part 58 cut off, at high frequency, the fourth circuit unit 57 and the first circuit unit 38 to which a battery (not shown) is connected (the first signal S1 and the second signal S2 are cut off). It should be noted that, since the battery is connected to the first circuit unit 38, GND of the first circuit unit 38 serves as reference potential. The second signal source 52 disposed in the fourth circuit unit 57 generates the second signal S2. Accordingly, in the cellular telephone device 1, in order to further stabilize the second signal S2, a configuration is employed in which the fourth circuit unit 57 is connected to the first circuit unit 38 by way of the fourth cutoff part 59. The fourth cutoff part 59 cuts off the first signal S1 and the second signal S2 in a minimum range so as not to cause any problem in terms of circuit operations. More specifically, the relationship among impedance Z1 of the first cutoff part 39, impedance Z2 of the third cutoff part 58 and impedance Z3 of the fourth cutoff part 59 is set to satisfy the following condition:

Condition: $Z1=Z2>Z3$

Furthermore, the configuration shown in FIGS. 7A and 7B can be appropriately selected in a range that is acceptable in terms of performance and cost of the cellular telephone device 1.

Moreover, as shown in FIG. 8, the cellular telephone device 1 is configured to connect the switching units (the first switching unit 36 and the second switching unit 55) to the first signal source 33 and the second signal source 52, respectively, so as to enable selection of power supply to the circuit board, in which the first connection part 32 is disposed, and to the antennas (the first antenna unit 31 and the second antenna unit 51). With such a configuration, in the cellular telephone device 1, in the slid-down state (the first state), satisfactory antenna characteristics can be achieved by switching the power supply to the antennas (the first antenna unit 31 and the second antenna unit 51). In addition, in the cellular telephone device 1, in the slid-up state (the second state), satisfactory antenna characteristics can be achieved by switching the power supply to the second circuit unit 41 and the third circuit unit 42.

It should be noted that, although the switching units in the present embodiment are the switching unit 36 and the second switching unit 55, they are not limited thereto, and the present invention may be configured with a branching filter.

Furthermore, in the present embodiment, although the fourth cutoff part 59 disposed between the fourth circuit unit 57 and the first circuit unit 38 cuts off the first signal S1 and the second signal S2 at high frequency, the present invention is not limited thereto. As shown in FIG. 9, the mobile terminal device of the present invention can achieve a similar effect by connecting the fourth circuit unit 57 and first circuit unit 38 through a thin GND line 60, without using a high-frequency cutoff unit. By appropriately adjusting the width of the GND line 60, the mobile terminal device of the present invention can achieve an effect similar to that in the case of using a high-frequency cutoff unit (the fourth cutoff part 59).

Moreover, although the present embodiment has been described by way of a configuration that directly connects the first connection part 32 and the second connection part 43, the present invention is not limited thereto, and may be configured by way of capacitive coupling via a sheet metal or an antenna.

In addition, the electric conductor is not limited to a circuit unit (circuit board), and a speaker may be used as an antenna, or a key operation unit or the like configured with an FPC (flexible substrate) may also be used for such a purpose. Furthermore, in the present embodiment, although the first connection part 32 has been described as being disposed on a circuit board, it is not limited thereto, and the first connection part 32 may not be disposed on a circuit board.

EXPLANATION OF REFERENCE NUMERALS 1 cellular telephone device
2 operation unit side body
2a first contact point
2b first conductive portion
2c first ground unit
2d first power supply unit
2e first signal processing unit
2f first circuit unit
2g first cutoff part
2h first high-frequency cutoff unit
3 display unit side body
3a second contact point
3b second conductive portion
3c second ground unit
3d second power supply unit
3e second signal processing unit
3f second circuit unit
3g second cutoff part
3h second high-frequency cutoff unit
31 first antenna unit
32 first connection part
33 first signal source
34 first power supply unit
35 second power supply unit
36 first switching unit
37 first control unit
38 first circuit unit
39 first cutoff part
41 second circuit unit
42 third circuit unit
43 second connection part
44 second cutoff part
51 second antenna unit
52 second signal source 53 third power supply unit
54 fourth power supply unit
55 second switching unit
56 second control unit
57 fourth circuit unit
58 third cutoff part
59 fourth cutoff part
60 GND line
61 fifth cutoff part

The invention claimed is:

1. A mobile terminal device, comprising:
a first body;
a second body;
a first conductive portion disposed in the first body and including a first contact point;
a second conductive portion disposed in the second body and including a second contact point; and
a first circuit unit disposed in any one of the first body and the second body, the first circuit unit including: a first ground unit connected to the first conductive portion via the first contact point; a first power supply unit connected to the second conductive portion via the second contact point; and a first signal processing unit connected to the first power supply unit, configured to process a first high frequency signal resonated by the second conductive portion,
wherein the first conductive portion includes a first area overlapping with the second conductive portion,
wherein the second conductive portion includes a second area overlapping with the first conductive portion,
wherein a first cutoff part is connected to at least one of the first conductive portion and the second conductive portion, and cuts off transmission of the first high frequency signal to an area toward a first end side from the first contact point of the first area, or to an area toward a second end side from the second contact point of the second area, and
wherein a second cutoff part is connected to at least one of the first conductive portion and the second conductive portion, and cuts off transmission of the second high frequency signal to an area toward the second end side from the first contact point of the first area, or to an area toward the first end side from the second contact point of the second area, and
the second cutoff part is an electronic component that cuts off transmission of the first high frequency signal and allows a direct current signal to pass therethrough.

2. The mobile terminal device according to claim 1, wherein a transmission path length of the first high frequency signal in the area toward the second end side from the first contact point of the first conductive portion is substantially identical to a transmission path length of the first high frequency signal in the area toward the first end side from the second contact point of the second conductive portion.

3. A mobile terminal device, comprising:
a first body;
a second body;
a first conductive portion disposed in the first body and including a first contact point;
a second conductive portion disposed in the second body and including a second contact point; and
a first circuit unit disposed in any one of the first body and the second body, the first circuit unit including: a first ground unit connected to the first conductive portion via the first contact point; a first power supply unit connected to the second conductive portion via the second contact point; and a first signal processing unit connected to the first power supply unit, configured to process a first high frequency signal resonated by the second conductive portion,
wherein the first conductive portion includes a first area overlapping with the second conductive portion,
wherein the second conductive portion includes a second area overlapping with the first conductive portion,
wherein a first cutoff part is connected to at least one of the first conductive portion and the second conductive portion, and cuts off transmission of the first high frequency signal to an area toward a first end side from the first contact point of the first area, or to an area toward a second end side from the second contact point of the second area, and
the mobile terminal device further comprising:
a second circuit unit disposed in any one of the first body and the second body, the second circuit unit including: a second ground unit connected to any one of the first conductive portion and the second conductive portion via any one of the first contact point and the second contact point; a second power supply unit connected to another one of the first conductive portion and the second conductive portion via another one of the first contact point and the second contact point; and a second signal processing unit connected to the second power supply unit, configured to process a second high frequency signal resonated by another one of the first conductive portion and the second conductive portion,
wherein a second cutoff part is connected to at least one of the first conductive portion and the second conductive portion, and cuts off transmission of the second high frequency signal to an area toward the second end side from the first contact point of the first area, or to an area toward the first end side from the second contact point of the second area.

4. The mobile terminal device according to claim 3, wherein a transmission path length of the second high frequency signal in the area toward the first end side from the first contact point of the first conductive portion is substantially identical to a transmission path length of the second high frequency signal in the area toward the second end side from the second contact point of the second conductive portion.

5. The mobile terminal device according to claim 3, wherein frequency of the first high frequency signal is different from frequency of the second high frequency signal.

6. The mobile terminal device according to claim 1, wherein the first contact point and the second contact point are capacitively coupled with each other.

7. The mobile terminal device according to claim 1, wherein the first cutoff part includes a parallel resonant circuit including a capacitor having predetermined capacity and a coil.

8. The mobile terminal device according to claim 3, wherein the second cutoff part includes a parallel resonant circuit including a capacitor having predetermined capacity and a coil.

* * * * *